Aug. 27, 1946.  H. J. ENGBRECHT  2,406,326
TOOL
Filed Jan. 19, 1944
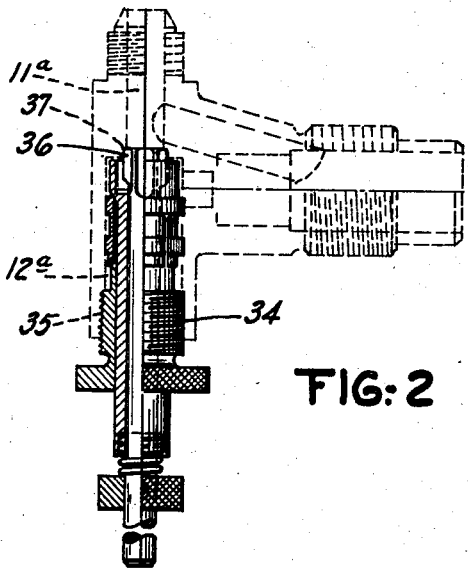
FIG:2
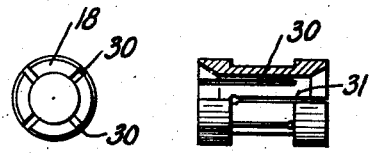
FIG:3   FIG:4
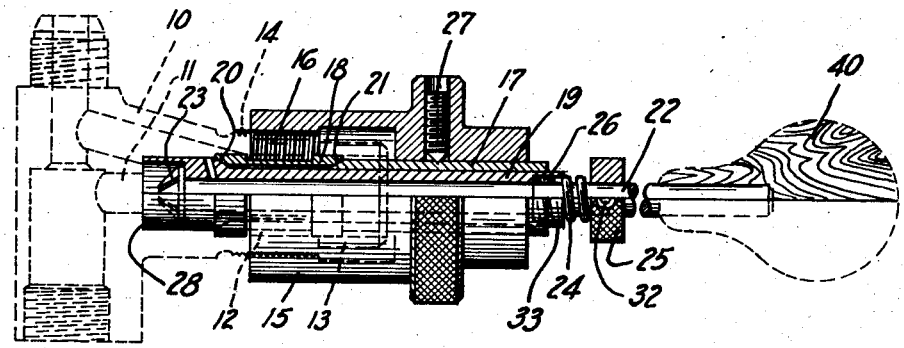
FIG:1
INVENTOR.
HERMAN J. ENGBRECHT
BY Cecil F. Arens
ATTORNEY Patented Aug. 27, 1946

2,406,326

UNITED STATES PATENT OFFICE 2,406,326

TOOL

Herman J. Engbrecht, North Hollywood, Calif., assignor to Bendix Aviation Corporation, North Hollywood, Calif., a corporation of California Application January 19, 1944, Serial No. 518,839

5 Claims. (Cl. 90—12.5)

This invention relates to tools for accurately cutting or finishing surfaces in valves and the like and is particularly useful for reaming a surface in concentric relation with another surface or surfaces.

An object of the invention is to facilitate the rapid and accurate cutting of a surface in concentric relation to another surface.

A more specific object is to provide a tool for cutting seats in valve bodies and the like which tool positively aligns the seat in true concentric relation with the passage or passages leading to the seat.

Other more specific objects and features of the invention will appear from the detailed description to follow.

It is common in the construction of hydraulic valves to employ two aligned bores of different diameter with a conical valve seat in the end of the smaller bore where it merges into the larger bore. Heretofore, it has been the practice to ream the conical seat and/or the smaller bore with a reaming tool admitted through the larger bore. However, the prior methods did not provide any positive means for aligning the tool with the larger bore, the skill of the workman being relied upon to so support the reaming tool that the resultant reamed surface would be reasonably accurately aligned with the larger bore. These previous methods have been unsatisfactory, not only because they required a considerable amount of skill on the part of the workman, but were slow, and, where accurate work was demanded, there were considerable numbers of rejections even with efficient workmen.

In accordance with the present invention, I eliminate the need of specially skilled workmen for performing this operation by providing a seat-reaming tool which has a guide structure expandable to wedge in the larger bore so that there is no possibility of the reaming tool being misaligned, even by unskilled workmen. I further provide for the rapid assembly of the reaming tool in the valve to be reamed, by utilizing the usual threads on the valve body for expanding the guide in the larger bore.

A full understanding of the invention may be had from the following detailed description with reference to the drawing, in which:

Fig. 1 is a view part in side elevation and part in section of a tool in accordance with the invention for reaming a conical seat in a valve body, the tool being adapted for a valve body with external screw threads.

Fig. 2 is a view part in side elevation and part in section of a tool in accordance with the invention for reaming a straight bore in a valve body having internal screw threads.

Fig. 3 is an end view of a collet employed in the tool, and

Fig. 4 is a side view, part in elevation and part in longitudinal section of the collet.

Referring first to Fig. 1, there is shown, in broken lines, a valve body 10 having a small bore 11 merging into a larger bore 12, which extends to the outer end of a tubular body portion 13, which is externally threaded as indicated at 14. As these bodies are received for finishing, the small bore 11 is approximately aligned with the bore 12, which in turn is at least approximately aligned with the external threads 14. To finish the body, the small bore 11 must have a conical seat cut therein at its outer end, which conical seat should be in alignment with both the axis of the large bore and the axis of the threads 14, if the bore and the threads are in perfect axial alignment. If the bore and threads are not in perfect alignment with each other, the axis of the seat should be midway between the axes of the bore and the threads respectively. Furthermore, if the small bore 11 was not originally in accurate alignment with the large bore 12, and external thread 16, it must be reamed to place it in alignment.

In the particular valve body 10 shown in the drawing, the left end portion of the large bore 12 is of slightly smaller diameter than the remainder, but this is of no particular moment insofar as the present invention is concerned.

A tool in accordance with the present invention for cutting a conical seat in the right end of bore 11 is shown in full lines in Fig. 1. It comprises a hollow body member 15 internally threaded at one end with threads 16 that are dimensioned to rather loosely engage the threads 14 on the valve body 10. Adjustably fitted in a smooth bore in the outer end of member 15 is a sleeve 17, the left end of which is chamfered or beveled to form a conical surface fitting against the beveled interior end of an expansible collet 18, which is adapted to be expanded against the large bore 12 of the valve body 10. To this end, there is accurately fitted within the sleeve 17 a tubular guide 19, which extends through the expansible collet 18 and is enlarged at its left end to fit loosely within the reduced end portion of the large bore 12. At the point of enlargement, the guide 19 is smoothly tapered to provide a flared or conical seat 20, which cooperates with the seat 21 on the sleeve 17 to expand the collet 18 when the tool is set.

The guide 19 rotatably supports the stem 22 of a conical reamer 23 which is rotated to ream the conical seat at the right end of the small bore 11. A handle 40 may be provided on the outer end of the stem 22 to facilitate its actuation manually, although it is to be understood that, if desired, the stem 22 can be gripped by the chuck of a drill or the like for its actuation. In order to prevent injury to the conical seat cut by the reamer as a result of accidental impact of the reamer against the seat while the reamer is not being turned, it is desirable to provide a helical spring 24 which is compressed between a stop 25 secured to the stem 22 and the inner end of a counter bore 26 in the right end of the guide 19. This spring 24 retracts the reamer head 23 away from the seat as soon as the actuating handle 40 is released.

The device is actuated as follows: First, the sleeve 17 is properly positioned longitudinally within the tool body 15 and locked into position by tightening set screws 27 in the body 15. Then the tool is attached to the valve body 10 by entering the inner end of the guide 19 into the large bore 12 and screwing the tool body 15 on to the external threads 14 of the valve body 10. This first moves the entire tool to the left until the left end 28 of the guide 19 rests against the shoulder at the left end of the large bore 12, which stops further movement to the left of the guide 19. Thereafter, as the tool body 15 is given its final turns, the sleeve 17 is moved to the left relative to the guide 19, causing the conical surfaces 21 and 20, on the sleeve 17 and the guide 19 respectively, to expand the collet 18 tightly against the large bore 12. As clearly shown in Figs. 3 and 4, the collet 18 has four slits 30 extending from the right end approximately three quarters of the way to the left end, and four slits 31 extending from the left end approximately three quarters of the way to the right end, the slits 31 being circumferentially positioned midway between adjacent slits 30. The collet is therefore free to expand, in response to the wedging action applied thereto by the conical surfaces 20 and 21, until its outer surface is expanded tightly against the bore 12, which occurs when the tool body 15 has been fully tightened.

As has been previously mentioned, the threads 16 in the tool body 15 are cut to fit loosely on the threads 14 of the valve body, so that, if the threads 14 are not exactly coaxial with the large bore 12, the tool body 15 can cock slightly with respect to threads 14, to permit the guide 19 to assume a position in which its axis is intermediate the axis of the bore 12 and the threads 16 respectively.

After the tool has been positioned as described, the conical seat is reamed at the right end of the small bore 11 by pressing the handle 40 to the left and rotating it.

The stop 25, in addition to functioning as a collar for the compression of the spring 24, also functions as a stop to limit the depth of cut made by the conical reamer 23. Thus, the stop 25 may be secured to the stem 22 of the reamer by an Allen set screw 32, and by loosening this screw, the stop 25 can be so positioned on the stem 22 as to contact the outer end 33 of the guide 19 when the reamer has cut to the desired depth.

Referring now to Fig. 2, there is shown a tool substantially identical with that described with reference to Figs. 1, 3 and 4 except that the body 15 is provided with external threads 34 to fit internal threads 35 in another branch of the valve body 10, and a straight reamer 35 is substituted for the conical reamer 23 of Fig. 1. It may be assumed that in Fig. 2 a conical seat 37 has already been reamed at the lower end of the passage 11a by employing in the tool of Fig. 2 a conical reamer similar to reamer 23 of Fig. 1, and that it has been discovered, after the formation of the seat 37, that the bore 11a is out of alignment with the bore 12a. Such misalignment can be readily detected after the conical seat has been cut, because the seat will vary in width at different circumferential points. Therefore, if, after the conical seat has been formed, as described with reference to Fig. 1, inspection of the seat shows that the small bore is out of alignment with the large bore, correction is made by applying the tool as previously described, but with a straight reamer 35 of suitable size substituted for the conical reamer 23 of Fig. 1. The cylindrical reamer is then advanced into the bore 11a for a short distance to form a counter bore that is in perfect alignment with the conical seat and with the large bore.

Although for the purposes of explaining the invention a specific embodiment thereof has been described in detail with reference to the drawing, it is to be understood that the invention is not limited to exact structures described but only to the extent set forth in the appended claims.

I claim:

1. A tool for machining a body having a cylindrical bore and screw threads in at least approximately concentric relation to said bore, to produce in said body a surface of revolution in approximate axial alignment with said bore, said tool comprising: a hollow guide dimensioned to enter said bore; a rotatable tool accurately guided by said guide for rotary and longitudinal movement coaxial with said guide; and means for positively positioning said guide within said bore, comprising an expansible annular member surrounding said guide and an annular wedge member aligned with and relatively axially moveable with respect to said guide, at least one of said members having a conical surface cooperative with the other member to expand said expansible annular member against said bore in response to relative axial movement of said members toward each other, and means for effecting said relative axial movement including means for limiting axial movement of said expansible member into said bore, and nut means adapted to engage the threads of said body, for moving said wedge member against said expansible member.

2. A tool as described in claim 1 for reaming a body having external threads surrounding said bore, in which said nut means comprises a skirt adapted to telescope over the threaded portion of said body member and having internal threads to engage therewith.

3. A tool as described in claim 1 for reaming a body in which the outer end portion of said large bore is internally threaded, in which said nut means comprises an annular member dimensioned to enter said large bore and externally threaded to engage with said threads in the body.

4. A tool as described in claim 1 in which said expansible annular member has two expansible annular, bore-contacting faces at opposite ends thereof, and cooperating faces on one end of said annular member and said guide, and cooperating faces on the other end of said annular member and said wedge member, whereby both ends of said annular member are expanded against said bore in response to the longitudinal movement of said wedge member produced by tightening said nut means.

5. A tool as described in claim 1 in which said nut means has a cylindrical bearing surface closely fitted on a cylindrical bearing surface on said guide whereby said nut means and said guide are maintained in alinement with each other, irrespective of misalinement between the bore and the threads of the body to be machined.

HERMAN J. ENGBRECHT.